UNITED STATES PATENT OFFICE.

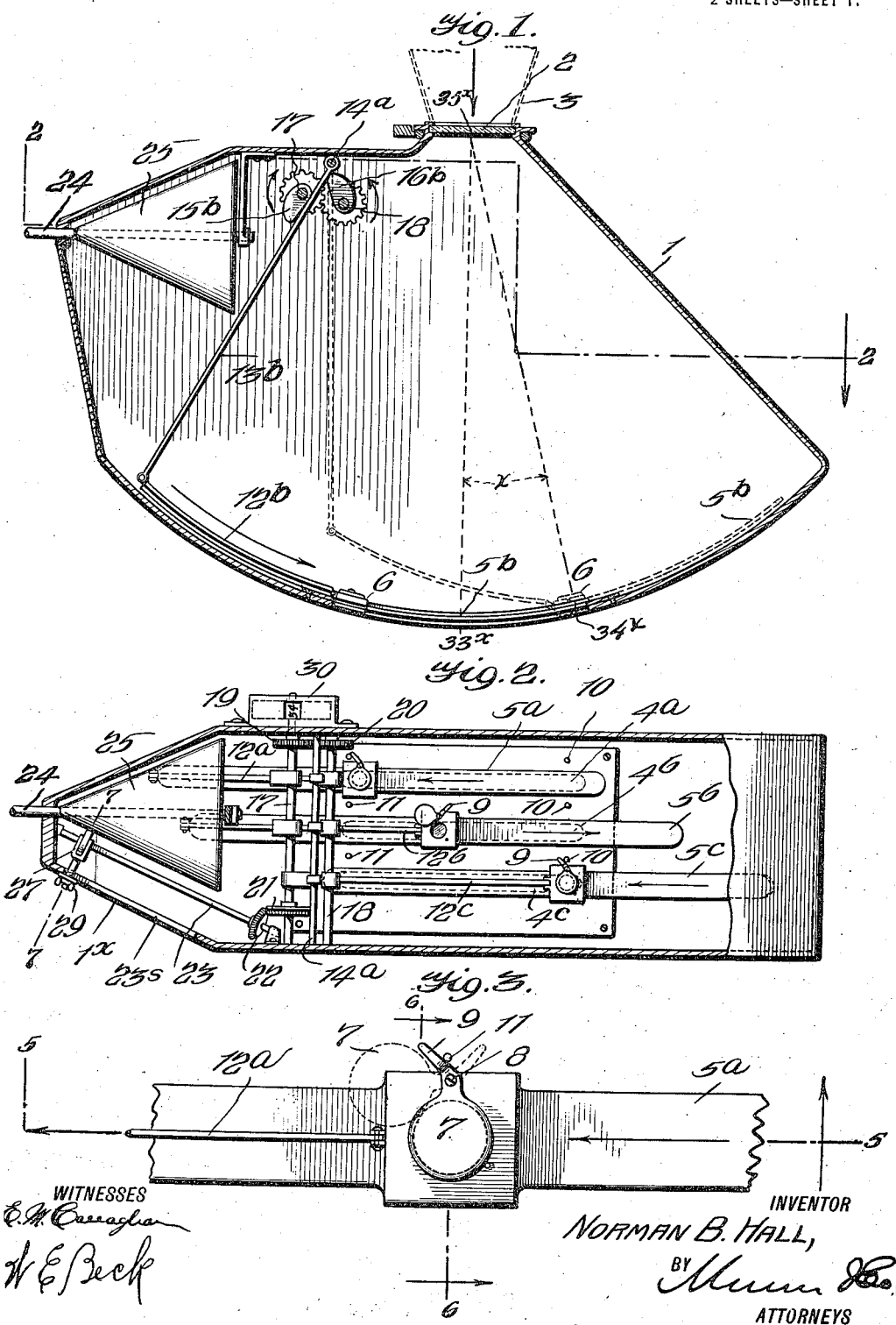

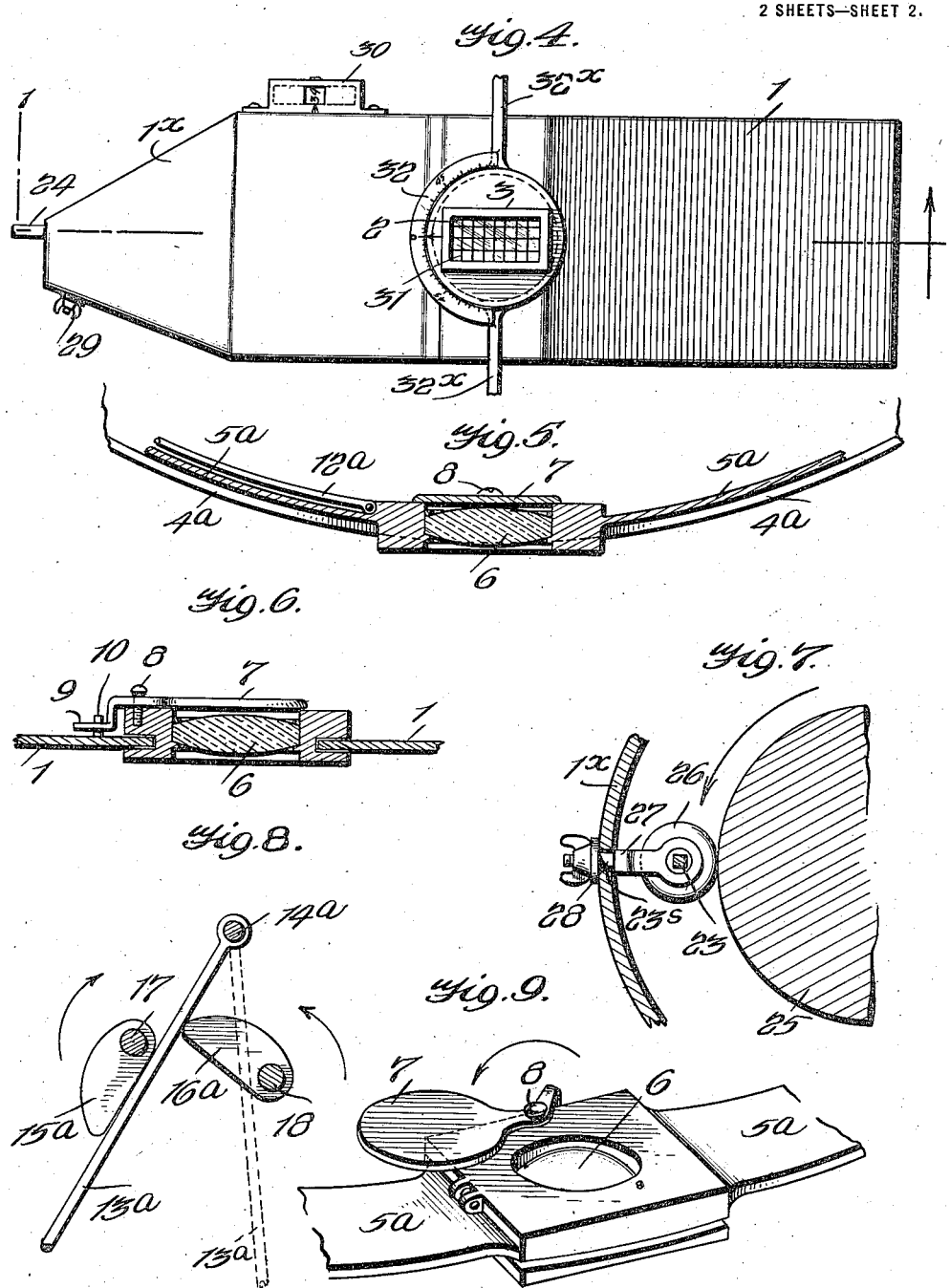

NORMAN BRIERLEY HALL, OF NORFOLK, VIRGINIA.

SPEED-MEASURING INSTRUMENT.

1,307,629.  Specification of Letters Patent.  Patented June 24, 1919.

Application filed October 24, 1916. Serial No. 127,404.

*To all whom it may concern:*

Be it known that I, NORMAN B. HALL, a citizen of the United States, and a resident of Norfolk, in the county of Norfolk and State of Virginia, have invented certain new and useful Improvements in Speed-Measuring Instruments, of which the following is a specification.

My invention relates to improvements in speed measuring instruments, more especially to instruments for measuring the speed of aeroplanes, and it consists in the combinations, constructions and arrangements herein described and claimed.

An object of my invention is to provide a device by means of which the speed of an aeroplane may be determined with fair accuracy by an observer in the aeroplane, from data which he makes during a flight.

A further object of my invention is to provide a device of the type described which is comparatively simple in construction, and which is, therefore, not liable to easily get out of order.

Other objects and advantages will appear in the following specification, and the novel features of the invention will be particularly pointed out in the appended claims.

My invention is illustrated in the accompanying drawings, forming part of this application, in which:

Figure 1 is a section along the line 1—1 of Fig. 4.

Fig. 2 is a section along the line 2—2 of Fig. 1.

Fig. 3 is a detail view of a shutter operating means.

Fig. 4 is a plan view of the device.

Fig. 5 is a section on the line 5—5 of Fig. 3.

Fig. 6 is a section through one of the lenses on the line 6—6 of Fig. 3.

Fig. 7 is an enlarged section on the line 7—7 of Fig. 2.

Fig. 8 is a detail view of the cams which drive the reciprocating lenses, and

Fig. 9 is a view showing a lens uncovered.

The theory upon which this instrument is constructed and operates, is based upon a phenomenon which is always observed when one is riding in vehicles such as railway trains. It is a fact that the objects which are near at hand appear to be speeding in a direction which is the reverse of that in which the train is going. Objects farther away also appear to move, but not as rapidly, while objects in the horizon appear at any one instant, to be relatively stationary.

Taking advantage of this phenomenon I have devised a device in which lenses are provided that move in directions parallel to the line of flight of the aeroplane, at such a speed that the objects which would ordinarily appear to be rushing past the aeroplane, appear to be stationary upon an image receiving surface of ground glass or similar substance so placed that the images projected thereon by the lenses are visible and in focus. In order to accomplish this the lenses must attain a given speed, which is dependent upon the speed of the aeroplane and the altitude of the aeroplane above the objects being observed. This is accomplished by the means which forms a part of the present invention.

In carrying out my invention I provide a casing 1 of the general shape shown in Fig. 1. At the top of this casing is disposed a plate of ground glass 2, there being a light-shield 3 disposed above the ground glass.

The bottom of the casing is arc-shaped and is provided with a plurality of slots such as those shown at $4^a$, $4^b$ and $4^c$ in dotted lines in Fig. 2. Arranged to cover these slots are slides $5^a$, $5^b$ and $5^c$. Each of these slides is provided with a lens, such as that shown at 6 in Figs. 5 and 6. A cover 7 is provided which is pivotally mounted at 8 and which has an arm 9 arranged to engage pins 10 and 11 to open and close the cover, in the manner hereinafter described. Secured to each of the slides are links $12^a$, $12^b$ and $12^c$ which are connected to rods $13^a$, $13^b$ and $13^c$ respectively. In Fig. 1 I have shown one of these rods as being pivoted to a fixed pivot $14^a$. Each rod, such as $13^a$, is acted on by a pair of cams such as $15^a$ and $16^a$ respectively, the former being on the shaft 17 and the latter being on shaft 18. A gear 19 on the shaft 17 meshes with the gear 20 on the shaft 18, so that these two shafts 17 and 18 are driven at the same rate of speed, the gears 19 and 20 being of the same size. The shaft 17 is provided with a gear 21 which meshes with a bevel gear 22 on a shaft 23 journaled in an extension $1^x$ of the casing 1.

Arranged to extend through one end of the casing extension $1^x$ is a shaft 24 which is driven by some constant source of power, and to which is secured a driving cone 25. It will be noted that the shaft 23 is parallel with the adjacent edge of the cone 25. The extension 1˟ is provided with a slot 23ª parallel with the shaft 23. A friction wheel 26 is mounted on the shaft 23 which, as is shown in Fig. 7, is preferably square in cross section, or of some shape other than round, so as to permit a sliding movement of the friction wheel 26, but not a rotative movement with respect to the shaft. The wheel 26 may be moved along the shaft 23 by means of a yoke 27 which is carried by an arm 28 which passes through the slot 23ˢ, the arm being provided with the thumb screw 29 so as to set the friction wheel in any desired position along the shaft 23 in contact with the friction cone 25.

Operatively connected to the shaft 17 is a speedometer 30. The ground glass 2 is preferably divided off into squares 31, as shown in Fig. 4, while a scale 32 is mounted, as shown in Fig. 4.

From the foregoing description of the various parts of the device, the operation thereof may be readily understood.

Let us assume that the aviator is flying at an altitude of one thousand feet and he wishes to determine the speed at which he is going, he looks through the light-shield and sees the objects beneath him apparently passing rapidly to the rear. He then adjusts the position of the friction wheel 27 until on looking through the light-shield, the objects on the earth appear to be substantially stationary or have reached their minimum degree of movement. In order to accomplish this it will be noted that the driving cone which causes the revolution of the shaft 23 through the medium of the gear 27, drives the shafts 17 and 18 as described, and that thus, through the medium of the cams such as 15ª and 16ª, the arms are reciprocated so as to cause the lenses to move backward and forward. Now, these lenses are all mounted so that they give upon the ground glass, an image of the scene below the aeroplane during their rearward movements. During the forward movements of the lenses they are closed. As will be seen from Fig. 2, the closing of the lenses is accomplished by the engagement of the arm 9 with the pin 10 at the end of each rearward stroke, while the opening of the lenses is accomplished by the engagement of the arm 9 with the pin 11 at the end of each forward stroke. The arrangement is such that one lens is always open to throw an image on the ground glass. Since the motion is rapid the effect is similar to that produced in a moving picture camera.

When the operator has so shifted the friction wheel 27 as to obtain the results stated, he notes the reading of the number wheel 30. Knowing the altitude which is given by the barograph he can obtain the speed of the aeroplane from a previously prepared table which shows the speed of the aeroplane corresponding to the various speeds of the lenses as shown by the number wheel 30, for that altitude or any other usual flying altitude.

Obviously the cams such as 15ª and 16ª must be designed to move the lenses and placed on the shafts 17 and 18 so as to maintain their proper relation. Therefore, the cams are so designed that the movement of the lenses toward the center of the arc of travel, 33˟, is accelerated, and from the center of the arc of travel is retarded due to the change in the angle $x$, Fig. 1. This acceleration and retardation is necessary in order to compensate for the error introduced by the decrease or increase of the angular bearing of an object on the surface of the earth as the line of bearing of that object approaches, passes and leaves the line 33˟—35˟. This acceleration will vary as the square of the cosine of the angle $x$, which is the angle formed by a line through the center of the open lens and through the center of the image receiving surface, 35˟, Fig. 1, and another line through a point which is the center of travel of that lens marked 33˟, Fig. 1, the angle $x$ being at the point of intersection of the lines 33˟—35˟ and 34˟—35˟.

It is desirable that this device may be swung in azimuth in order that the line 1—1, of Fig. 4 will coincide with the actual line of flight, irrespective of the heading of the aircraft. This is accomplished by supporting the device in the bracket 32˟ shown in Fig. 4. This bracket carries a graduated semi-circular scale 32 from which is ascertained the "angle of drift."

The device is simple in construction, and being such will not readily get out of order. The device as illustrated in the present application is typical of a number of devices which might be made on the same general principle without departing in the least from the spirit and the scope of the invention.

I claim:

1. A speed measuring instrument for aeroplanes and the like, comprising a casing having an image-receiving surface, a lens carried by the casing and movable in an arc about the central portion of the image-receiving surface, and adapted to throw an image of the ground beneath the aeroplane on said surface, and means for varying the rate of movement of the lens so as to render the image thrown by the lens on the image-receiving surface substantially stationary at any given moment.

2. A speed measuring instrument for aeroplanes and the like, comprising a casing having an image-receiving surface, a plurality of coöperating lenses carried by the casing, each lens being moved in a separate arc about the center of the image-receiving surface, and means for varying the rate of movement of the lenses so as to render the image thrown by the lenses on the image-receiving surface substantially stationary at any given moment.

3. A speed measuring instrument for aeroplanes and the like, comprising a casing having an image-receiving surface, a plurality of lenses carried by the casing, each of said lenses being movable in an arc about the center of the image-receiving surface and arranged to project an image of the ground beneath the aeroplane upon said surface, means for reciprocating the lenses in a direction parallel with the line of flight of the aeroplane, means for covering the lenses during their forward movement, and means for uncovering the lenses during their rearward movement.

4. In a speed measuring instrument for aeroplanes and the like, a casing, an image-receiving surface carried by the casing, a plurality of lenses movable in separate arcs about the center of the image-receiving surface, means for reciprocating the lenses in a direction parallel with the line of flight of the aeroplane, means for covering the lenses in their forward movement and for uncovering them in their rearward movement, said lenses being disposed one ahead of the other in regular order, whereby some lens of the group of lenses is always open and the remaining lenses are closed.

5. In a speed measuring instrument for aeroplanes and the like, a casing, an image-receiving surface carried by the casing, a plurality of lenses movable in separate arcs about the center of the image-receiving surface, means for reciprocating the lenses in a direction parallel with the line of flight of the aeroplane, means for covering the lenses in their forward movement and for uncovering them in their rearward movement, said lenses being disposed one ahead of the other in regular order, whereby some lens of the group of lenses is always open and the remaining lenses are closed, and means for varying the rate of movement of the lenses to render the image on the image-receiving surface substantially stationary at any given moment.

6. In a speed measuring instrument for aeroplanes and the like, a casing, an image-receiving surface carried by the casing, a plurality of lenses movable in separate arcs about the center of the image-receiving surface, means for reciprocating the lenses in a direction parallel with the line of flight of the aeroplane, means for covering the lenses in their forward movement and for uncovering them in their rearward movement, said lenses being disposed one ahead of the other in regular order, whereby some lens of the group of lenses is always open and the remaining lenses are closed, and means for varying the rate of movement of the lenses to render the image on the image-receiving surface substantially stationary at any given moment, said last named means comprising a lens carrier for each lens, a rock arm secured to each lens carrier, means for reciprocating each rock arm, and variable speed transmission connecting the driving mechanism on the aeroplane with each of said rock arms.

7. In a speed measuring instrument for aeroplanes and the like, a casing, an image-receiving surface carried by the casing, a plurality of lenses movable in separate arcs about the center of the image-receiving surface, means for reciprocating the lenses in a direction parallel with the line of flight of the aeroplane, means for covering the lenses in their forward movement and for uncovering them in their rearward movement, said lenses being disposed one ahead of the other in regular order, whereby some lens of the group of lenses is always open and the remaining lenses are closed, means for varying the rate of movement of the lenses to render the image on the image-receiving surface substantially stationary at any given moment, said last named means comprising a lens carrier for each lens, a rock arm secured to each lens carrier, a cam arranged to bear on each arm, a common cam shaft for said cams and a variable speed mechanism disposed between the driving mechanism on the aeroplane and said common cam shaft.

8. In a speed measuring instrument for aeroplanes and the like, a casing, an image-receiving surface carried by the casing, a plurality of lenses movable in separate arcs about the center of the image-receiving surface, means for reciprocating the lenses in a direction parallel with the line of flight of the aeroplane, means for covering the lenses in their forward movement and for uncovering them in their rearward movement, said lenses being disposed one ahead of the other, in regular order whereby some lens of the group of lenses is always open and the remaining lenses are closed, means for varying the rate of movement of the lenses to render the image on the image-receiving surface substantially stationary at any given moment, said last named means comprising a lens carrier for each lens, a rock arm secured to each lens carrier, a cam arranged to bear on each arm, a common cam shaft for said cams, a variable speed mechanism disposed between the driving mechanism on the aeroplane and said common cam shaft, and a speedometer for measuring the speed of rotation of said cam shaft.

9. A speed measuring device for aeroplanes or the like comprising a casing having a ground glass plate in its top, the bottom of the casing being curved and being provided with a plurality of slots disposed in lines parallel to the line of flight of the aeroplane, a lens carrier disposed in each slot, means for reciprocating said lens carriers, the speed of the lenses toward the center being accelerated, and away from the center being retarded and varying as the square of the cosine of the angles made by the line through the center of the ground glass and the center of travel of any lens, and the line from the center of the ground glass through the optical axis of the same lens.

NORMAN BRIERLEY HALL.